Nov. 4, 1930.  H. E. CHRISTIE ET AL  1,780,293
AUTOMATIC TRANSMISSION
Filed July 15, 1925  3 Sheets-Sheet 1

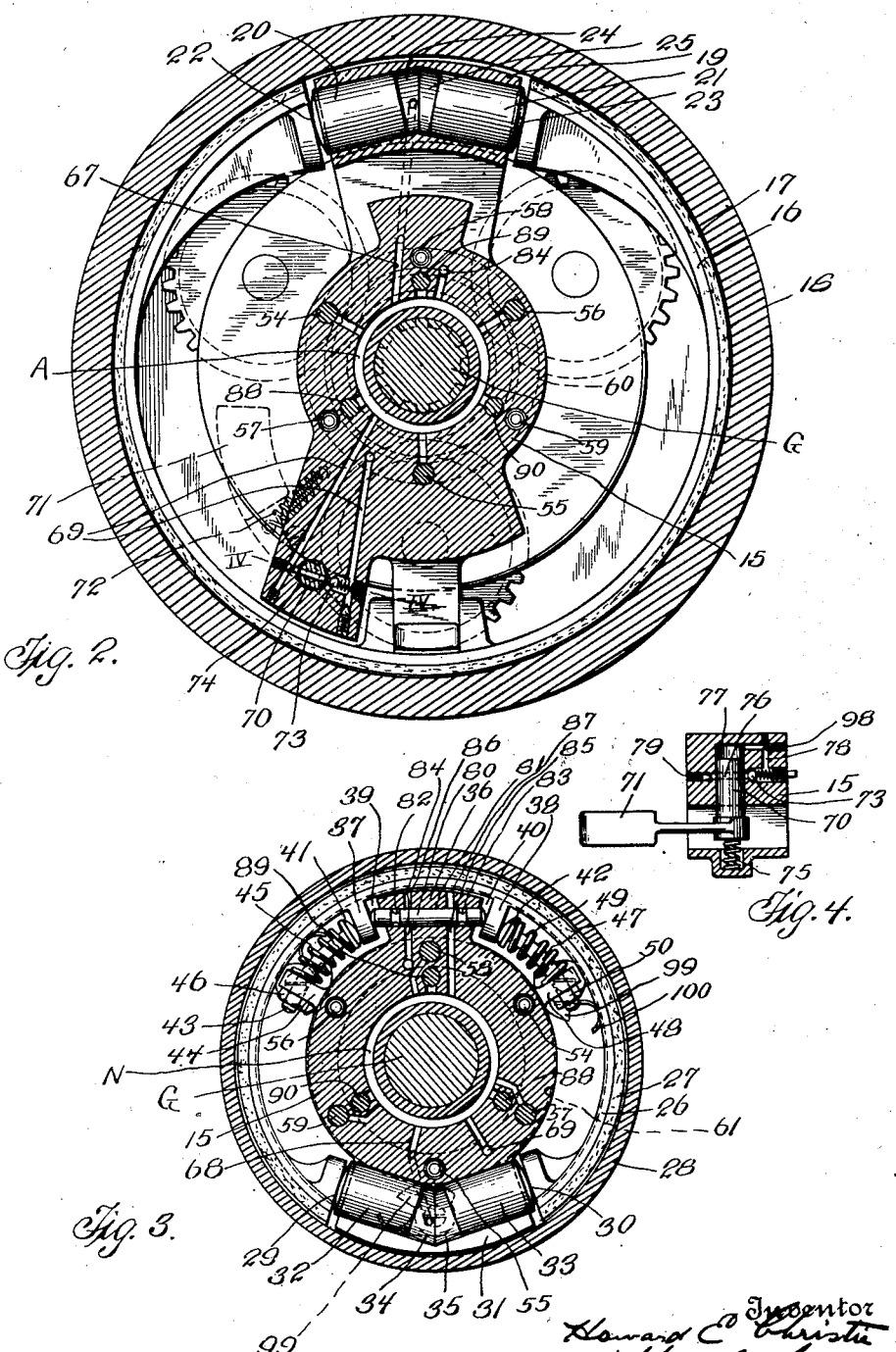

Nov. 4, 1930.  H. E. CHRISTIE ET AL  1,780,293
AUTOMATIC TRANSMISSION
Filed July 15, 1925   3 Sheets-Sheet 3

Patented Nov. 4, 1930

1,780,293

UNITED STATES PATENT OFFICE

HOWARD E. CHRISTIE AND KIBBEY W. COUSE, OF BRONX, NEW YORK, ASSIGNORS TO C. N. K. TRANSMISSION CORP., OF NEW YORK, N. Y., A CORPORATION OF NEW YORK

AUTOMATIC TRANSMISSION

Application filed July 15, 1925. Serial No. 43,749.

This invention relates to an automatic transmission, and an object of the invention is to provide a transmission in which greater or less torque will be applied upon the driven shaft automatically and without manual manipulation of any kind.

A more detailed object is to provide a transmission which when used as a part of the drive mechanism of a vehicle or the like, will automatically shift from "low" gear to a "higher" gear in starting the vehicle and at a time when the vehicle has attained such momentum as to render the use of the higher gear proper.

A further object is to so construct the device that the change from one speed ratio to another will be accomplished without dropping or in any wise releasing the load.

A further object is to so construct the device that it may be used either in association with the usual mechanical gear shifting mechanism found in present day automobiles or without said gear shifting mechanism.

A further object is to so construct the device as to utilize for its active medium a quantity of fluid and yet so that only small portions of said fluid are at any time under any considerable pressure.

Other objects and aims of the invention, more or less specific than those referred to above, will be in part obvious and in part pointed out in the course of the following description of the elements, combinations, arrangements of parts and applications of principles constituting the invention and the scope of protection contemplated will be indicated in the appended claims.

In the accompanying drawings which are to be taken as a part of this specification, and in which we have shown merely a preferred form of embodiment of the invention:—

Fig. 2 is a transverse sectional view taken substantially upon the plane of line II—II of Fig. 1.

Fig. 3 is a similar sectional view taken substantially upon the plane of line III—III of Fig. 1, and Fig. 4 is a fragmentary detailed sectional view taken upon the plane of line IV—IV of Fig. 2.

Figure 1:
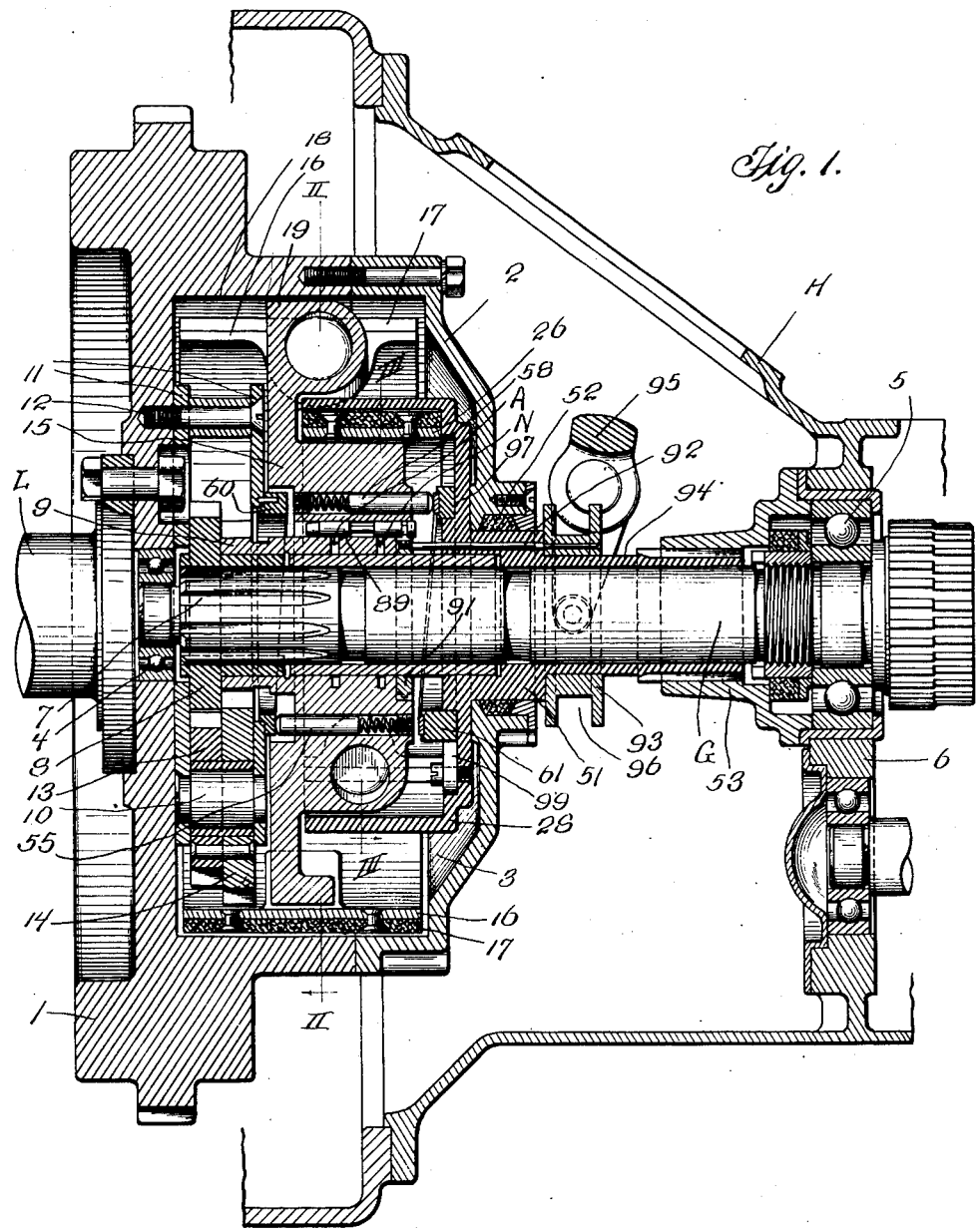
Fig. 1 is a vertical sectional view taken through a transmission constructed in accordance with this invention.

Referring to the drawings for describing in detail the structure shown therein the reference character L indicates a drive shaft, that is the shaft which is directly connected with a suitable prime mover such as the engine of an automobile or the like.

The reference character G indicates a driven shaft, that is the shaft which is intended to be driven from or by the shaft L, and through the transmission comprising this invention, and which in turn may be connected with the rear wheels of the vehicle.

To the drive shaft L is fixed the usual fly wheel 1 and to the rear face of this is fixed a cover piece 2 which co-operates as a part of the fly wheel to provide a suitable cavity 3 within the fly wheel for containing moving parts of the present transmission.

The driven shaft G extends into the cavity 3 in axial alignment with the drive shaft L and is preferably rotatably connected with said shaft L as by means of suitable ball-bearing parts 4 surrounding the end of the shaft G.

Rearwardly of the cover 2 of the fly wheel, and spaced therefrom is a second ball-bearing device 5 for supporting the adjacent portion of the shaft G, said bearing 5 being formed within a stationary frame part 6 which may conveniently if desired comprise a portion of a stationary protecting housing H for the entire mechanism.

The forward end of the shaft G is suitably splined as at 7, and fitted thereonto so as to rotate at all times therewith is a gear 8.

Rotably mounted upon the shaft G adjacent to the gear 8 is a second gear 9, of relatively less diameter than the gear 8.

The fly wheel 1 carries several sets of planet gears mounted upon suitable planet studs 10 which are held in a suitable frame 11 connected rigidly with the fly wheel as by means of bolts or the like 12. Each set of planet gears includes a relatively small gear 13 and a relatively larger gear 14, the two gears of each set being rigidly connected together and freely rotatable upon the studs 10, and the teeth of the gears of all of the sets being in constant mesh with the teeth of the gears 8 and 9, the planet gears 13 engaging the gear 8 and the planet gears 14 engaging the gear 9.

Rigidly connected with the gear 9 and also freely rotatable upon the shaft G is a rotor 15 and surrounding this rotor is a clutch band 16 having thereon suitable clutch facing material 17 disposed for clutch engagement with the inner annular surface portion 18 formed within the fly wheel 1 and cover piece 2.

The clutch band 16 is formed separately from the rotor 15 and is of spring material so arranged and constructed as to stand normally in a relatively contracted position with the facing material 17 out of gripping contact with the clutch surface 18. The opposite ends of this clutch band are spaced apart and a portion as 19 of the rotor 15 projects into the space between these ends and carries a pair of pistons 20 and 21 arranged in opposed relation with their outer ends bearing against the opposing end surfaces 22 and 23 respectively of the clutch band 16 so that when said pistons are forced outwardly along their cylinders 24 and 25 they will cause the clutch band to expand into gripping engagement with the clutch surface 18, and so that when pressure is relieved from said pistons the resilient nature of the clutch band will cause the pistons to be pressed inwardly toward each other to thus enable the clutch band to move out of gripping engagement with the surface 18.

The rotor 15 carries also a brake band 26 having thereon suitable brake facing material 27, this band being also of spring material and adapted to stand thereby normally in a relatively contracted position with the facing material 27 out of gripping contact with the stationary brake drum 28 with which it co-operates.

The brake band 26 is smaller and more easily operated than the clutch band 16. Its two ends, as 29 and 30 are spaced apart and a portion as 31 of the rotor 15 projects into the space between these ends and carries a pair of pistons 32 and 33 in cylinders 34 and 35 adapted to expand the brake band when the pistons are forced outwardly along their cylinders.

At a point diametrically opposite to the portion 31 the rotor is provided with an extension 36 which projects between a pair of lugs 37 and 38 provided upon the brake band, there being a limited amount of clearance between the extension 36 and said lugs 37 and 38, as indicated by the reference characters 39 and 40, so as to permit of a limited rotary movement of the rotor relative to the band for purposes which will be presently fully described. Resilient head pieces as 41 and 42 are carried by the rotor and engage the lugs 37 and 38 to hold the rotor normally with its extension 36 midway between the lugs 37 and 38.

The resilient head piece 41 is formed upon a slide bolt 43 carried by a projection 44 of the rotor, and a compression spring 45 engages between the projection 44 and the head piece 41 to hold the head piece against the lug 37, a suitable retaining element 46 being provided upon the slide bolt to limit the action of the spring 45.

The resilient head piece 42 is formed upon a slide bolt 47 carried by a projection 48 of the rotor and a compression spring 49 engages between the projection 48 and the head piece 42 to hold the head piece against the lug 38, a suitable retaining element 50 being provided upon the slide bolt to limit the action of the spring 49.

The spring 45 is somewhat lighter than the spring 49 for a purpose which will be presently referred to, but irrespective of this the retaining elements 46 and 50 will function normally to center the extension 36 of the rotor between the lugs 37 and 38 of the brake band.

The brake drum 28 has a sleeve portion 51 which surrounds the shaft G and thereby supports the brake drum concentric with said shaft. This sleeve projects through the cover 2, being provided if desired with a suitable packing 52, and is splined into a retaining socket 53 provided upon the housing H so that the sleeve and the brake drum are thereby prevented from any rotary movement while yet permitting ready dissassemblage of the parts upon occasion.

It is intended that the cavity 3 within the fly wheel shall at all times contain a generous supply of fluid, such as oil, which may or may not entirely fill said cavity.

Carried by the rotor 15 are two separate sets of pumps one set being associated with the pistons for operating the clutch band 16 and the other set being associated with the pistons for operating the brake band 26.

The set of pumps for operating the clutch band 16 is shown in the drawings as consisting of three pump devices as 54, 55 and 56, while the set of pumps for operating the brake band 26 is shown in the drawings as consisting of three pump devices as 57, 58 and 59.

A circular cam 60 is provided, carried by the fly wheel, for operating the clutch band pumps, and a similar cam 61 is provided, carried by the brake drum 28, for operating the brake band pumps.

Each of these pump devices as shown in the drawings consists of a simple plunger 62 received in a bore 63 of the rotor and spring pressed, as by a suitable spring 64 outwardly against the respective cams. Inlet and outlet valves 65 and 66 respectively are provided to facilitate the pumping action as the plungers move back and forth within the bores.

A suitable annular passage A connects together the clutch band pumps 54, 55 and 56 and a passage 67 extends therefrom into communication with the cylinders 24 and 25 of the clutch pistons 20 and 21, it being here noted that the cylinders of these pistons are in common communication with each other so that the oil pumped thereinto presses with equal force against the opposing ends of the two pistons.

A suitable annular passage N connects together the brake band pumps 57, 58 and 59 and a passage 68 extends therefrom into communication with the cylinders 34 and 35 of the brake pistons 32 and 33, it being here again noted that the cylinders of these pistons also are in common communication with each other so that the oil pumped thereinto presses with equal force against the opposing ends of the two pistons.

The pistons 20 and 21, and 32 and 33 are thus describable as floating, and this characteristic is particularly important as regards the pistons 32 and 33 since it permits free functioning of these pistons to operate the brake band while yet permitting a degree of uninterrupted rotary movement of the rotor within the brake band as hereinafter described.

Extending from the annular passage A is a passage 69 which communicates with the interiors of the brake pumps 57, 58 and 59 and thence with the passage 68. This passage 69 is arranged to be opened and closed by a valve 70 which is centrifugally controlled by a weight 71 carried by the rotor. A tension spring 72 is provided to hold the weight 71 normally in open position and the weight being arranged to be influenced by the rotary movement of the rotor so as to extend the spring and close the passage 69.

A suitable check valve 73 is provided in the passage 69 between the valve 70 and the pumps 57, 58 and 59, said check valve being arranged to prevent retrogressive movement of fluid from any of the brake pumps through the valve 70.

The valve 70 as illustrated consists of a simple plug shaped member received in a cylindrical socket 74. It is not only rotatable in this socket under the influence of the weight 71 and the spring 72, but it is also longitudinally movable along the length of the socket. A compression spring 75 is arranged to urge it inwardly and to thereby normally hold it in a position such that the transverse opening 76 thereof is in line with the passage 69 to control the opening and closing of said passage by rotation of the plug. Beyond the inner end of the plug a cavity as 77 is provided and from this cavity a passage 78 extends into communication with the passage 69 at a point between the check valve 73 and the brake pumps, it being understood that any excessive pressure of fluid exerted within the cavity 77 will cause the plug 70 to be forced longitudinally against the pressure of spring 75, thus moving the transverse opening 76 out of the plane of the passage 69 and thereby closing said passage irrespective of any rotary movement of the plug.

A simple form of reducing device as 79 may be provided in the passage 69 between the clutch pumps and the valve 70 for determining the amount of free space for the travel of fluid along said passage at all times.

Carried by the extension 36 of the rotor is a load-shifting valve 80. As illustrated, this valve comprises a single longitudinally movable rod slidable in a tangential bore 81 of said extension 36 and having its opposite ends projecting from opposite sides of said extension and into engagement with the lugs 37 and 38 of the brake band, the end portions of said rod normally bridging the spaces 39 and 40 which, as hereinbefore mentioned, occur between the extension 36 and said lugs.

Whenever the rotor and brake band move relatively to each other however, so that the extension 37 approaches, or comes into engagement with, one or the other of the lugs 37 and 38, the rod is correspondingly shifted along the length of its bore 81.

Formed in this valve rod are two annular grooves as 82 and 83. When the rod moves under pressure from the lug 37, and consequently against the pressure of spring 49, the groove 82 communicates with a passage 84, and when the rod is moved in the opposite direction, as by the lug 38, and against the pressure of the spring 45, the groove 83 communicates with a passage 85.

The passage 84 extends from the clutch-piston-feeding passage A and opens into the cavity 3 as at 86.

The passage 85 extends from the brake-piston-feeding passage N and opens into the cavity 3 as at 87.

The communication of the passages 84 and 85 with the interior of the cavity 3 is normally closed by solid portions of the valve rod 80, but one or the other of said passages are opened to the cavity 3 according as the valve rod is moved in one direction or the other.

Passages 84 and 85 communicate with a set of manually operated relief valves 88, 89 and 90. These manually operated valves are carried by the rotor, being received in suitable bores of the rotor extending parallel to the shaft G and are connected together for simultaneous operation as a single valve device as by means of a collar 91.

Figure 5:
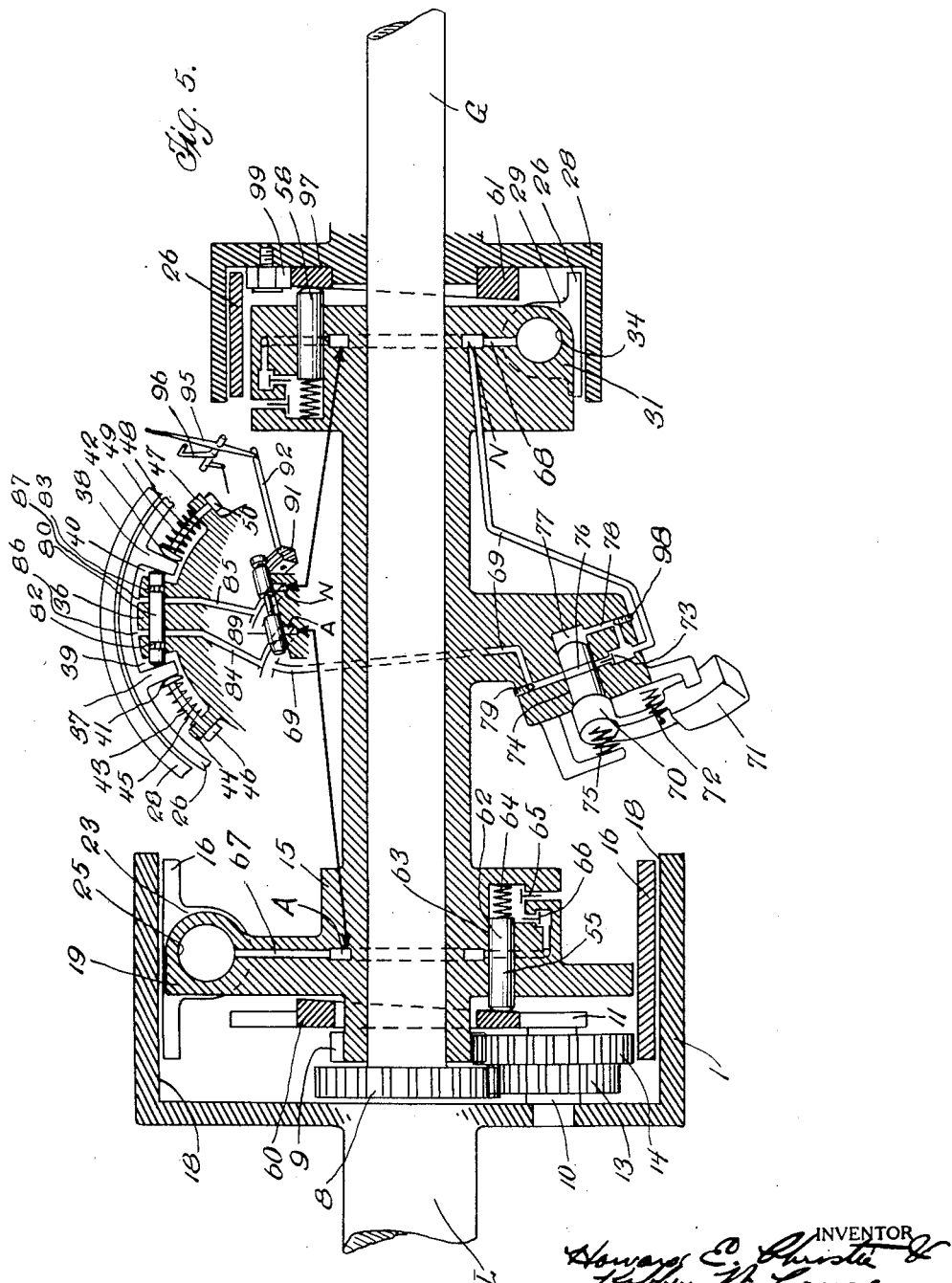
Fig. 5 is a diagrammatic view prepared to illustrate the operation of the mechanism.

The collar 91 is mounted to slide longitudinally along the shaft G, one or more connecting rods 92 extending therefrom through the hub portion of the brake drum 28 and being connected with an external collar 93 slidably mounted upon the sleeve portion 94 of the brake drum and arranged to be manually operated by a suitable lever device 95 which engages within a groove 96 of the collar. The lever 95 of course extends to a suitable position accessible to the vehicle driver, and it is intended that it shall be so related to the gas control lever, as 96, of the vehicle (see Fig. 5) that in moving the gas control lever to increase the supply of gas to the engine such movement will also move the valves 88, 89 and 90 toward the left, and thereby close the passages 84 and 85.

When the lever 95 is operated to move the valves 88, 89 and 90 toward the right, the passages A and N will be uncovered, the passage A being uncovered in advance of the passage N. The uncovering of these passages will permit free movement of fluid from the passages outwardly into the cavity 3 and thus relieve the pressure behind the clutch-band and brake-band pistons.

The operation of the mechanism may now readily be understood as follows:

Assuming the car to be stationary, and the motor to be motionless. The gas control lever, corresponding with or connected to the lever 95, is in its "off" position with the relief valves 88, 89 and 90 in position with the passages A and N uncovered.

Now start the motor, as by any suitable means for instance the usual electrical self starting device: The motor will turn over at "idling" speed due to the "off" position of the gas control lever 96. The rotation of the drive shaft L and the fly wheel 1 will cause the planetary gears 13 to walk around the gear 8 on the shaft G in a motor-wise direction, the gears 13 meanwhile also turning in a motor-wise direction upon their own bearings.

The planetary gears 14 will now cause the gear 9 and the rotor to travel relatively slowly in a reversed, or contra-motor-wise direction.

The opposing rotation of the fly wheel and rotor will cause the pump cam 60, which is fixed to the fly wheel, to operate the clutch band pumps 54, 55 and 56, while the rotation of the rotor relative to the stationary pump cam 61 will operate the brake drum pumps cam 57, 58 and 59. All of the pumps will thus pump fluid from the cavity 3 into the passages to which they are connected, but for the time being however this fluid will move freely through said passages and outwardly again into the cavity 3 through the relief valves 88, 89 and 90.

To start the movement of the car it is simply necessary now to move the lever 95 toward "on" position. This movement will first cause the valves 88, 89 and 90 to close and then the further movement of said lever will serve to feed increased gas supply to the vehicle engine.

As soon as the relief valves are thus closed the fluid pumped into the passages 67 and 68 will pile up behind the brake and clutch pistons.

The brake band 26 must move to gripping position against the drum 28 prior to any engagement of the clutch band with the fly wheel. For this purpose the passage 69 will now serve to conduct fluid away from the clutch pistons to the brake pistons.

The relatively smaller size of the brake pistons, and the consequent need for a less quantity of fluid to effect their complete movement than is required for the larger pistons of the clutch band will also produce this desired result.

A difference in the capacity of the two sets of pumps might also be provided to insure the gripping of the brake band ahead of the clutch band if desired, or the clutch band might be made of such stiffer material than the brake band as to accomplish the same end.

As the pressure builds up within the brake cylinders and moves the brake band against the drum 28 the rotation of the rotor 15 will be stopped, the stoppage being accomplished gradually as the brake band moves into tighter and tighter frictional contact with its drum.

As the resistance to rotation of the rotor increases so also does the strain of the planetary gears 13 against the central gear 8 for rotating the shaft G until said shaft itself begins to rotate and thereby move the car.

When the brake band has finally moved into full gripping engagement, and the rotor brought to a standstill, the shaft G will rotate at a speed in accordance with the ratio of the several gears and the speed of the engine and will move the car accordingly as will be readily understood.

The operation of the brake pumps will of course have been stopped.

As the brake band gripped against its drum and thereby retarded and stopped the rotor the continuing effort of the rotor to rotate was felt by the compression spring 49 so that said spring was compressed between its lugs 38 and 48, see Fig. 3, the extension 36 of the rotor meanwhile moving toward the lug 37 of the brake band and thereby opening the clutch passage 84 to cavity 3 through the groove 82 of slide valve 80. This relieved all pressure in the clutch cylinders.

If, due to leakage or otherwise, the pressure in the brake cylinders becomes diminished so that the brake band partially releases its grip upon the brake drum the consequent rotation of the rotor will operate the brake pumps and replenish the supply in the brake cylinders and thus substantially maintain the grip of the brake band.

The car is now rolling and is gradually gathering momentum. As the momentum increases the strain on the driven shaft G will be correspondingly reduced and the pressure of the rotor tending to rotate the brake band within the brake drum will also be reduced until presently the power of the spring 49 will be sufficient to move the rotor again to its normal position with extension 36 midway between the brake band lugs 37 and 38 thus closing the outlet through passage 84 so that pressure will immediately begin to build up in the passage 67 and in the clutch cylinders 24—25.

This pressure in the clutch cylinders will now move the clutch band 16 into position gripping the fly wheel. Passage of fluid to the brake band is at this moment prevented by the fact that the fluid pressure present in the brake cylinders and pumps is also present in the cavity 77 and is holding the valve plug 70 pressed outwardly so that the passage 76 is out of alignment and the valve therefore closed.

The passage 78 is provided with a set screw or other device as 98 by which to limit its size and thereby retard movement of liquid through said passage. In this way the cavity 77 is made to serve as a dash-pot for cushioning and retarding return movement of the plug 70 into the cavity. A too early opening of the passage 69 is thus prevented.

The rotor will now rotate with the fly wheel and thus, through the medium of the planetary gears, will rotate the shaft G substantially as in direct connection with the fly wheel. The initial movement of the rotor with the fly wheel has moved the extension 36 of the rotor toward the stop 38 of the brake band, against the tension of the light spring 45, and has opened the passage 85 through the groove 83 of the valve 80 and has thus relieved all pressure from the brake cylinders so that the brake band and rotor is free to rotate with the fly wheel.

The relief of pressure in the brake cylinders, by enabling release of the brake band from the brake drum will enable the spring 45 to move the brake band toward the spring 49 and close the passage 85. And said two springs will now co-operate to center the brake band with respect to extension 36.

The rotation of the rotor will generate a centrifugal force upon the weight 71 and cause said weight to swing radially outwardly and thereby close the valve 70 the dash-pot having by this time lost its power to hold the plug 70 pressed outwardly due to the relief of pressure in the brake cylinders.

If the pressure within the clutch cylinders should become reduced, as by leakage or otherwise, so that the clutch band fails to hold tightly against the fly wheel, the resultant relative rotation as between the fly wheel and the rotor will operate the clutch pumps and immediately replenish the pressure.

Likewise, if, due to leakage past the valve 70, or to unintentional operation of the brake valves, the pressure should build up in the brake cylinders and move the brake band against the brake drum this action would merely momentarily retard the free rotation of the brake band, compress the light spring 45 and move the valve 80 to open the passage 85 and thereby relieve the pressure in the brake cylinders.

Here it is noted that the circular cam 61 which operates the brake pumps is carried in a circular run-way 97 provided for it upon the brake drum 28 so that said cam is rotatable concentrically about the shaft G. Suitable means is provided to restrict this rotation to one circular direction. As illustrated this restricting means comprises a plurality of friction dogs 99 which are pivotally mounted upon the brake drum and which are provided with spring devices 100 holding them against the outer annular surface of the cam in such wise that they serve to hold the cam against rotation in a contra-motor-wise direction but permit free rotation of the cam in a motor-wise direction. Hence the cam is effective for operating the brake pumps during the time while the rotor is moving in its contra-motor-wise direction and the parts in what is herein above referred to as "low speed" condition, but is not effective for operating the brake pumps when the rotor is moving in a motor-wise direction with the fly wheel and the parts in what may be termed a "direct" or "high speed" condition. It will be understood that the friction of the pump rods against the cam in the latter instance will be sufficient to cause the cam to rotate with the rotor rather than to operate the pumps.

The car is now moving in "direct" or "high speed" connection with the engine and the rotor and brake band are centralized with passages 84 and 85 both closed.

Under these conditions, if the load on the driven shaft G be increased so that the speed of the engine, and consequently the speed of rotation of the rotor, is cut down, as for instance when the machine is ascending a grade, the centrifugal force upon the weight 71 will be reduced so that the spring 72 will overcome said force and swing the weight for opening the valve 70. The pressure in the clutch cylinders will thus be dissipated through said valve 70.

The fluid moving at this time away from the clutch cylinders and through the valve 70 will back up within the brake pumps and brake cylinders and expand the brake band 26.

The continued rotation of the fly wheel against the resistance in the driven shaft G at the present low speed produces a tendency for the rotor to rotate in a contra-motor-wise direction. The reduction of pressure in the clutch cylinders will permit the clutch band to slip with respect to the fly wheel and the building up of pressure in the brake cylinders will cause the brake band to drag against the brake drum. This drag, with the rotor now moving in a contra-motor-wise direction, will almost instantly compress the spring 49, and cause the passage 84 to move into register with the groove 82 of valve 80 and thereby entirely relieve the pressure from the clutch cylinders. The clutch band will contract free of the fly wheel. The continued movement of the rotor in a contra-motor-wise direction will, through action of the brake pumps, continue to build up the pressure in the brake cylinders to move the brake band into tight engagement with the brake drum whereupon the rotation of the rotor will be arrested and the machine will then proceed with the parts in "low speed" condition as before.

The change again from "low speed" condition to "high speed" condition, as when the machine passes onto a grade which may be readily negotiated in "high speed" condition, will be effected in the same manner as already pointed out with respect to the starting of the machine.

During the change from a "low speed" condition to a "high speed" condition both the clutch band and the brake band slip until the pressure on the spring 49 counter-balances the strength of said spring and effects a release of clutch band, and thus it will be seen that although the mechanism provides for a change from one speed condition to another automatically as required according to the road conditions yet the change is accomplished without at any time releasing the load or to any extent losing the value of momentum in the machine.

No manual manipulation of parts is required to bring about a shift from one speed condition to another, yet the relief valve 89 and its connections with lever 96 provides a conveniently manually operable element by which the shift may be accomplished at any desired time.

By constructing the relief valves 88, 89 and 90 so that they will always relieve pressure in the clutch cylinders ahead of the brake cylinders it will be seen that by holding said valves in a given position with the clutch cylinders relieved and the brake cylinders not relieved the mechanism may be held in "low speed" condition for an indefinite period.

The automatic shifting from one speed condition to another will always be effected at times which are predetermined with regard to the capabilities of the vehicle engine, and hence no undue strain will at any time be imposed upon the engine.

While an ordinary mechanical gear shifting mechanism may be used in conjunction with this device yet such gear shifting mechanism is not deemed necessary under ordinary circumstances since it is usually sufficient to shift between only two speed conditions as herein described. The mechanical gear shifting mechanism if used would provide speed changes which in number would be always twice the normal number of speed changes provided by the mechanical mechanism, this due to the fact that for each different speed condition in the mechanical mechanism the present device would provide two changes.

The part of the usual mechanical gear shifting mechanism which provides for reversing the direction of movement of the vehicle is desirable for use in conjunction with the present device and it is contemplated that in using the present device upon vehicles a reversing gear such as that last referred to will be employed.

It will further be apparent that while the main cavity 3 contains a generous quantity of oil or other fluid yet no part of this fluid is at any time under pressure except the small amounts which are contained within the brake and clutch cylinders and within the several passages connected therewith, that any leakage from the fluid which is under pressure will only flow into the main mass of liquid within the cavity 3 and will be immediately replenished by operation of the pumps which operation will be induced as a result of the leakage so that the pressure will be maintained substantially constant irrespective of the leakage. And in this connection it will be noted further that the pressure maintained by the pumps within the clutch and brake cylinders is at no time maintained at a level greater than that required for the work in hand. In the clutch cylinders for instance the pressure will be sufficient to hold the clutch band just tight enough against the fly wheel to prevent interrotation. The required tightness will be determined by the value of the resistance of rotation present in the driven shaft G, that is by the load being drawn. If the load is light then a relatively slight pressure of the clutch band against the fly wheel will suffice to prevent interrotation whereas if the load be heavy a relatively increased pressure in the clutch band will be necessary, and will be brought about by interrotation, or slippage, which will operate the clutch pumps whenever the increased load is applied.

In the instances of the brake cylinders, the pressure here will be maintained only sufficient to hold the brake band against rotation in proportion to the strain of the rotor in its attempt to rotate under varying loads on the shaft G. If the pressure in the cylinders be light and an increase of load is applied to the shaft G then the rotor will slip, operate the brake pumps, and build up pressure in the brake cylinders to a point sufficient to cause the brake band to hold tight enough against the brake drum to withstand the efforts tending to rotate the rotor as a result of the increased load.

As many changes could be made in this construction without departing from the scope of the invention as defined in the following claims, it is intended that all matter contained in the above description or shown in the accompanying drawings, shall be interpreted as illustrative only and not in a limiting sense.

Having thus described our invention what we claim as new and desire to secure by Letters Patent is:—

1. A power transmitting mechanism comprising a drive shaft, a driven shaft, a pair of gripping devices connecting said shafts, means whereby said gripping devices are operable respectively to effect "high speed" and "low speed" connections between said shafts, and fluid pressure means automatically operable in response to an increase in load upon the driven shaft to cause operation of one of said gripping devices and in response to a decrease in load upon the driven shaft to cause operation of the other gripping device, both without dropping the load.

2. A power transmitting mechanism comprising a drive shaft, a driven shaft, speed changing means connecting said shafts, fluid pressure means automatically operable in response to load changes upon the driven shaft to control said speed changing means, said speed changing means including a clutch subject to slippage, and means whereby the speed ratio of said speed changing means is determined by slippage of said clutch.

3. A power transmitting mechanism comprising a drive shaft, a driven shaft, speed changing means connecting said shafts, said speed changing means including a clutch subject to slippage, fluid pressure means to control the operation of said clutch, a valve to control said fluid pressure means, and means whereby the speed ratio of the speed changing means is altered by slippage of the clutch and without releasing the load.

4. A power transmitting mechanism comprising a drive shaft, a driven shaft, speed changing means connecting said shafts, said speed changing means including a clutch subject to slippage, fluid pressure means to control the operation of said clutch, and a centrifugally operated valve member to control said fluid pressure means, together with means operable by slippage of said clutch to change the speed ratio of said speed changing means.

5. A power transmitting mechanism comprising a drive shaft, a driven shaft, speed changing means connecting said shafts, said speed changing means including a clutch, a brake, and fluid pressure means to control said clutch and brake in response to changes of load upon the driven shaft whereby to increase the torque upon the driven shaft in response to an increase of load upon said driven shaft.

6. A power transmitting mechanism comprising a drive shaft, a driven shaft, and speed changing means connecting said shafts including a pair of relatively movable members, fluid pressure means to operate one of said members for causing said member to grip the other member, and means whereby relative movement between said members will increase the fluid pressure for operating the first member, together with other means for controlling said fluid pressure.

7. A power transmitting mechanism comprising a drive shaft, a driven shaft, and speed changing means connecting said shafts including a clutch drum and a brake drum, a clutch band associated with said clutch drum, a brake band associated with said brake drum, fluid pressure means to operate said clutch band and said brake band for causing said bands to grip their respective drums, means whereby relative movement between the bands and their respective drums will increase the fluid pressure for operating said bands, and other means for controlling said fluid pressure.

8. A power transmitting mechanism comprising a drive shaft, a driven shaft, and speed changing means connecting said shafts, said speed changing means comprising a member rotatable upon the driven shaft, gears connecting said member with the drive shaft and with the driven shaft to rotate said member in either a forward or reverse direction, and means whereby the direction of rotary movement of said member will determine the speed ratio of said speed changing means.

9. A power transmitting mechanism comprising a drive shaft, a driven shaft, and speed changing means connecting said shafts, said speed changing means comprising a member rotatable upon the driven shaft, gears connecting said member with the drive shaft and with the driven shaft to rotate said member in either a forward or reverse direction, a clutch by which to fix said member with the drive shaft to thereby lock said gears and rotate the driven shaft in "high speed" condition with the drive shaft, means whereby an increased load upon the driven shaft will release the clutch, and means whereby release of the clutch will effect "low speed" relation of the drive shaft to the driven shaft.

10. A power transmitting mechanism comprising a drive shaft, a driven shaft, and speed changing means connecting said shafts, said speed changing means comprising a control member rotatable upon the driven shaft, gears connecting said control member with the drive shaft and with the driven shaft to rotate said control member in either a forward or reverse direction, a clutch by which to fix said control member with the drive shaft to thereby lock said gears and rotate the driven shaft in "high speed" condition from the drive shaft, and means whereby an increasing load upon the driven shaft will release the clutch and effect "low speed" relation of the drive shaft to the driven shaft, said last mentioned means including a brake for said control member and means to effect operation of said brake to stop the rotation of the control member upon imposition of the increased load.

11. A power transmitting mechanism comprising a drive shaft, a driven shaft, a speed changing means connecting said shafts, said speed changing means comprising a rotatably mounted member, fluid controlled connections between said member and said shafts operable to rotate said member in either a forward or a reversed direction, and means whereby the direction of rotation of said member will determine the speed ratio of said speed changing means.

12. A power transmitting mechanism comprising a drive shaft, a driven shaft, a speed changing means connecting said shafts, said speed changing means comprising a rotatably mounted member, fluid controlled connections between said member and said shafts operable in response to load changes upon the driven shaft for rotating said member in either a forward or a reversed direction, and means whereby the direction of rotation of said member will determine the speed ratio of said speed changing means.

In testimony whereof we affix our signatures.

HOWARD E. CHRISTIE.
KIBBEY W. COUSE.